United States Patent [19]

Gaskill

[11] Patent Number: 5,757,782
[45] Date of Patent: May 26, 1998

[54] PAGING SYSTEM WITH MULTIPLE BASEBAND SUBCARRIERS

[75] Inventor: Garold B. Gaskill, Tualatin, Oreg.

[73] Assignee: Seiko Communications Systems, Inc., Beaverton, Oreg.

[21] Appl. No.: 511,168

[22] Filed: Aug. 4, 1995

Related U.S. Application Data

[63] Continuation-in-part of Ser. No. 184,030, Jan. 21, 1994, Pat. No. 5,537,407, which is a continuation of Ser. No. 967,469, Oct. 23, 1992, abandoned, which is a continuation of Ser. No. 356,630, May 22, 1989, Pat. No. 5,159,713, which is a continuation of Ser. No. 101,137, Sep. 24, 1987, abandoned, which is a division of Ser. No. 802,844, Nov. 27, 1985, Pat. No. 4,712,808.

[51] Int. Cl.$^6$ ................................................. H04Q 7/08
[52] U.S. Cl. ................. 370/313; 340/825.44; 455/38.1; 455/45
[58] Field of Search .................................. 370/313, 314, 370/329, 343; 340/825.44; 455/38.1, 45

[56] References Cited

U.S. PATENT DOCUMENTS

| | | | |
|---|---|---|---|
| 4,713,808 | 12/1987 | Gaskill et al. | 370/94 |
| 4,875,038 | 10/1989 | Siwiak et al. | 340/825 |
| 4,882,579 | 11/1989 | Siwiak | 340/825 |
| 4,891,637 | 1/1990 | Siwiak et al. | 340/825 |
| 4,897,835 | 1/1990 | Gaskill et al. | 370/94.1 |
| 4,928,096 | 5/1990 | Leonardo et al. | 340/825 |
| 4,940,963 | 7/1990 | Gutman et al. | 340/313 |
| 4,951,044 | 8/1990 | Nelson et al. | 340/825 |
| 4,991,212 | 2/1991 | Foti | 455/43 |
| 5,023,933 | 6/1991 | Karkota, Jr. | 455/45 |
| 5,070,329 | 12/1991 | Jasinski | 340/825 |
| 5,117,460 | 5/1992 | Berry et al. | 381/41 |
| 5,124,697 | 6/1992 | Moore | 340/825 |
| 5,142,279 | 8/1992 | Jasinski et al. | 340/825 |
| 5,142,692 | 8/1992 | Owen | 455/48 |
| 5,148,469 | 9/1992 | Price | 379/57 |
| 5,150,110 | 9/1992 | Breeden | 340/825 |
| 5,153,582 | 10/1992 | Davis | 340/825 |
| 5,155,479 | 10/1992 | Ragan | 340/825 |
| 5,159,331 | 10/1992 | Park et al. | 340/825 |
| 5,162,790 | 11/1992 | Jasinski | 340/825 |
| 5,166,932 | 11/1992 | Hoff et al. | 370/95.1 |
| 5,170,487 | 12/1992 | Peek | 455/45 |
| 5,185,604 | 2/1993 | Neeple et al. | 340/825.44 |
| 5,187,470 | 2/1993 | King et al. | 340/825.44 |
| 5,189,413 | 2/1993 | Gaskill et al. | 340/825.44 |
| 5,220,366 | 6/1993 | King | 354/76 |
| 5,260,700 | 11/1993 | Merchant et al. | 340/825.44 |
| 5,311,516 | 5/1994 | Kuznicki et al. | 370/94.1 |
| 5,404,588 | 4/1995 | Henze | 455/45 |
| 5,489,879 | 2/1996 | English | 455/63 |
| 5,581,576 | 12/1996 | Lanzetta et al. | 455/45 |
| 5,649,297 | 7/1997 | Park | 455/45 |

OTHER PUBLICATIONS

"High Speed Subcarrier Is Wave of Future" by Lyle Henry, Guest Commentary, *Radio World*, Jun. 1, 1994.

*Primary Examiner*—Melvin Marcelo
*Attorney, Agent, or Firm*—Elmer Galbi

[57] ABSTRACT

Pager data is transmitted at different subcarrier frequencies on different FM broadcast channels. The subcarrier frequency of the pager data is selected to avoid conflicts with signals transmitted from other systems. The pager receiver decodes data at any one of the multiple subcarrier frequencies according to the active subcarrier used on the currently tuned broadcast channel. In one embodiment, the subcarrier frequency of the pager data is contained in control packets of a time division multiplexed data frame. The receiver decodes the control packets to determine which broadcast frequencies and associated subcarrier frequencies contain potential pager signals. The receiver accordingly searches the identified broadcast frequency and automatically reconfigures a circuit demodulator to decode data packets at the identified subcarrier frequencies.

7 Claims, 7 Drawing Sheets

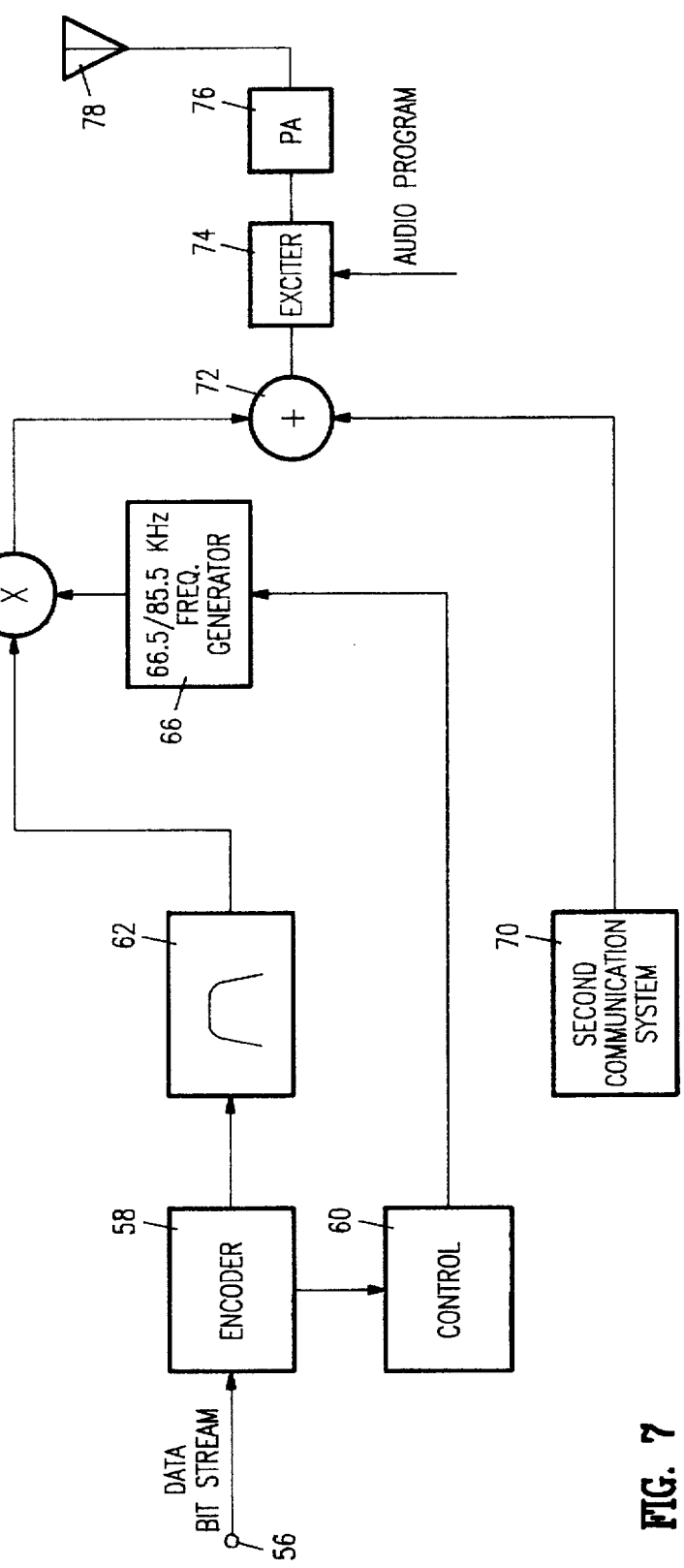

PAGING SYSTEM WITH MULTIPLE BASEBAND SUBCARRIERS

RELATED APPLICATIONS

The present invention is:

a) a continuation-in-part of application Ser. No. 08/184,030, filed Jan. 21, 1994, now U.S. Pat. No. 5,537,407 which is, b) a continuation of application Ser. No. 07/967,469, filed Oct. 23, 1992, which is now abandoned and which is, c) a continuation of patent application Ser. No. 07/356,630, filed May 22, 1989, which is now issued U.S. Pat. No. 5,159,713, which is, d) a continuation of patent application Ser. No. 07/101,137, filed Sep. 24, 1987, which is now abandoned and which is, e) a divisional of patent application Ser. No. 06/802,844, filed Nov. 27, 1985, which is now issued U.S. Pat. No. 4,713,808.

FIELD OF THE INVENTION

This invention relates generally to radio systems for transmitting messages and data and more particularly to radio systems which use F.M. subcarrier to transmit messages and data.

BACKGROUND OF THE INVENTION

Various issued patents and pending applications including U.S. Pat. Nos. 4,713,808 and 4,897,835 (both by Gaskill), U.S. Pat. No. 5,187,470 (King) and pending application Ser. No. 08/046,112, filed Apr. 9, 1993, show systems where digital data is transmitted on an FM subcarrier and modulated on an FM baseband. In the systems shown in the above references, the data is transmitted to a pager receiver that filters the subcarrier from the rest of the FM baseband and then decodes digital pager data which was transmitted on the subcarrier into digitally encoded messages.

Most commercial FM radio stations use the baseband frequencies from 23 hertz (Hz) to 53 kilohertz (kHz) to transmit stereo program material. FIG. 1 shows spectral components of an FM broadcast channel used in transmissions of both analog radio station broadcasts and digital paging messages. A first component 12 transmits left plus right channel audio material. A component 14 transmits left minus right channel audio material. A stereo tone signal 18 is also transmitted at 19 kHz.

As previously described in Gaskill, a subcarrier 16 which has a center frequency at 66.5 kHz and a bandwidth that extends from approximately 57 kHz to 76 kHz can carry paging data.

Communication systems, other than the pager system described in Gaskill, use FM broadcast subcarrier signals for transmitting messages and data. For example, a communication system called "radio data services (RDS)" can be used to transmit information on a subcarrier.

The type of information which is typically transmitted by RDS systems includes traffic information, and an identifier of the type of programming which a station normally transmits and alternative language translations. Subcarrier 20 in FIG. 1, represents a component of the FM baseband used for transmitting information from a communication system such as from RDS.

As shown in FIG. 1, a portion of baseband frequencies used by subcarrier 20 overlaps the baseband frequencies used by subcarrier 16. Thus, if a communication system is using subcarrier 20 on the broadcast channel shown in FIG. 1, subcarrier 16 cannot be transmitted. Various communication systems may use other portions of the FM baseband frequencies. Thus, even if the frequency of subcarrier 16 is changed to avoid subcarrier 20, on some FM stations the new subcarrier frequency may still interfere with other signals from other communication systems.

Accordingly, a need exists for a low cost pager system that transmits and receives signals on FM stations that also carry signals from other communication systems.

SUMMARY OF THE INVENTION

Pager data is transmitted and received on different broadcast channels that also carry signals from other communication systems. The transmitter locates the pager data at a subcarrier frequency that does not conflict with other signals transmitted on the same FM baseband. A receiver identifies the specific subcarrier frequency used for transmitting the pager data on each broadcast channel. The receiver then automatically reconfigures to decode pager data at the identified subcarrier frequency for the currently tuned broadcast channel.

Because, the pager data is transmitted and received at different subcarrier frequencies, the pager data can coexist with signals from other systems transmitted on the same FM broadcast channels. Thus, pager data can be transmitted on broadcast channels already carrying signals from other communication systems.

Pager data is formatted into time division multiplexed frames containing both control packets and data packets. The control packets contain information identifying the subcarrier frequency used for transmitting the data packets containing the pager data. The receiver decodes the control packets to determine the subcarrier frequency value and accordingly decodes data packets at the identified subcarrier frequency.

In one embodiment, two different subcarrier frequencies are used for transmitting the same pager data. The transmitter modulates pager data at either the first or second subcarrier frequency according to baseband utilization by other communication systems on the given broadcast channel. The receiver determines which pager subcarrier frequency is used on the currently tuned broadcast channel and then demodulates data packets at that subcarrier frequency. The receiver includes a filter that decodes signals at either the first or second subcarrier frequency by simply selecting different filter coefficients or by decoding the pager data at different clock rates.

A local list is contained in the control packets transmitted by the FM broadcast stations. The local list identifies other broadcast channels in the region carrying pager data. The pager receiver searches for pager signals on the broadcast channels identified in the local list and then automatically reconfigures the receiver demodulation circuitry to the subcarrier frequency associated with the currently tuned broadcast channel.

This invention is particularly useful in a communication system designed to (a) operate with a large number of broadcast stations in a large number of geographical regions and (b) operate in conjunction with broadcast signals transmitted from other communication systems.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 6 is a detailed diagram of the transmitter protocol shown in FIG. 5.

FIG. 7 is a diagram of a transmitter circuit according to the invention.

DETAILED DESCRIPTION

Figure 1:
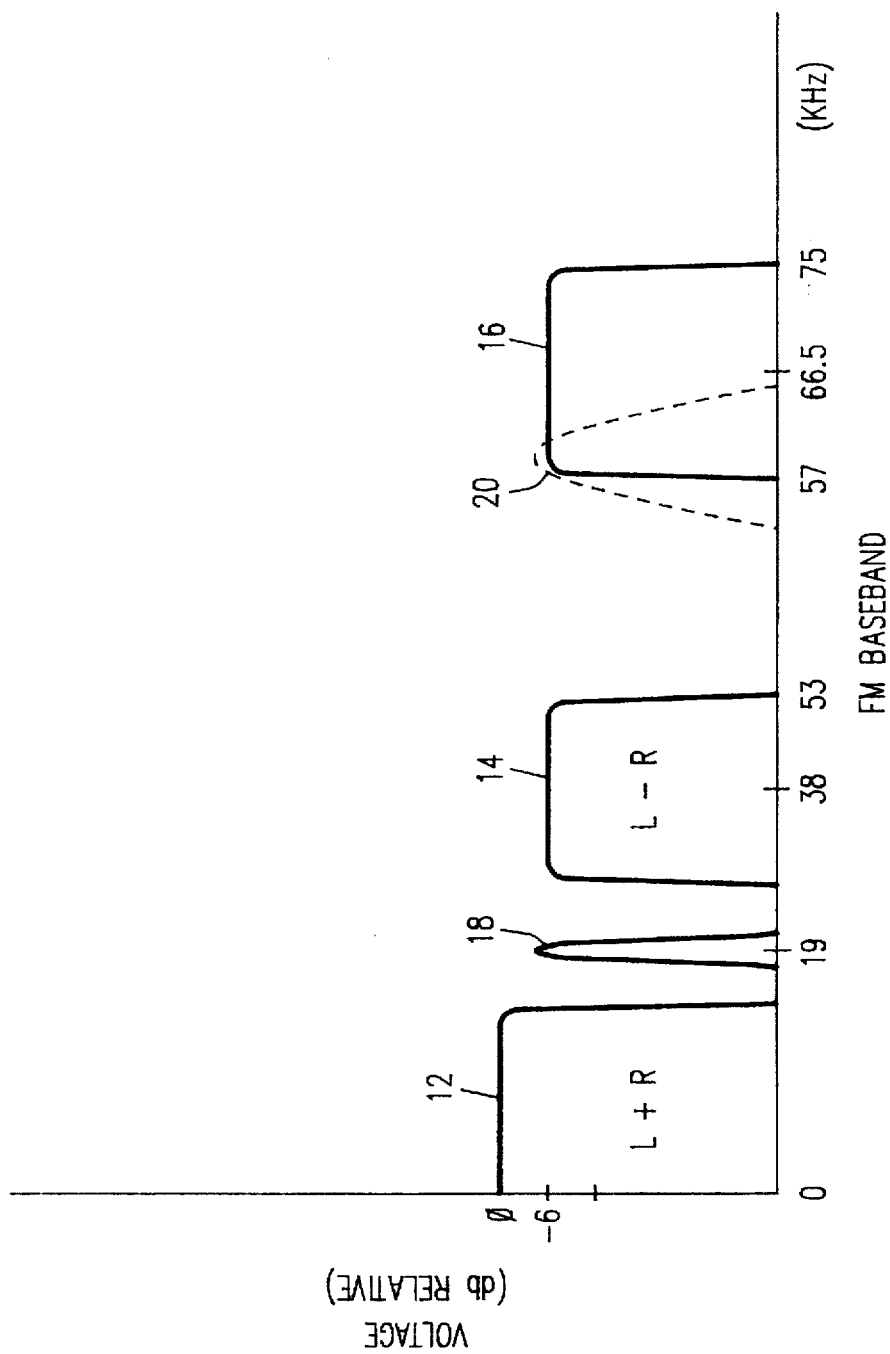
FIG. 1 is a prior art diagram of an FM baseband transmitted from an FM broadcast station.
Figure 2A:
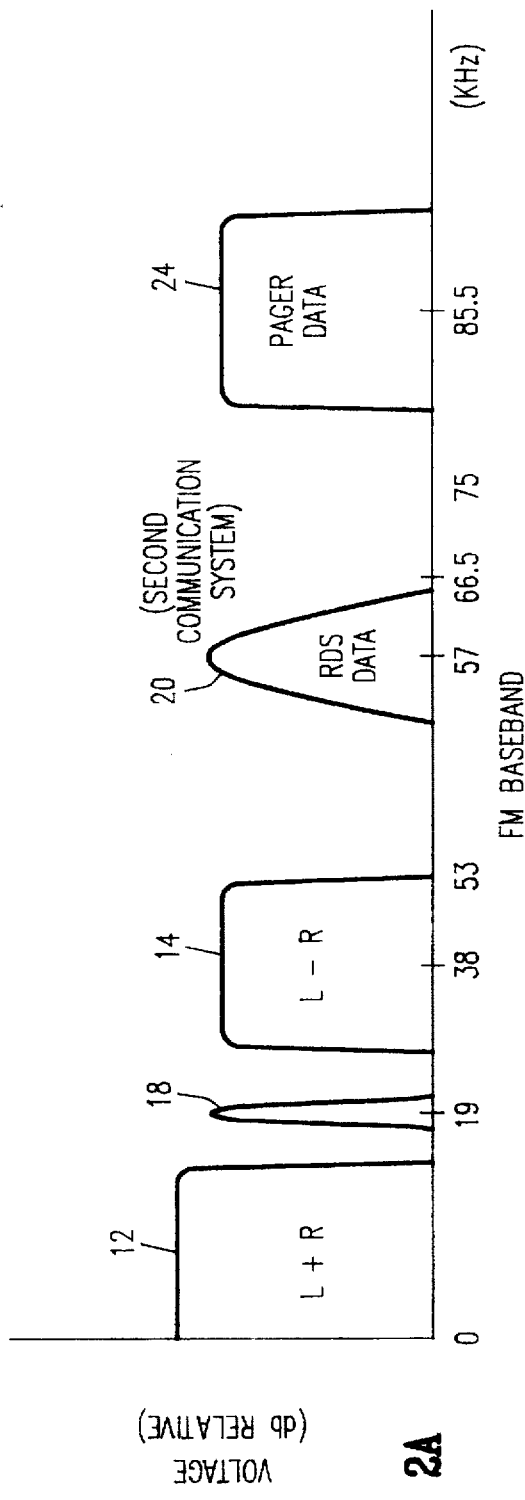
FIG. 2A is a diagram of an FM baseband transmitted from an FM broadcast station including a first subcarrier generated from a first communication system and a second subcarrier generated from a pager system according to the invention.
Figure 2B:
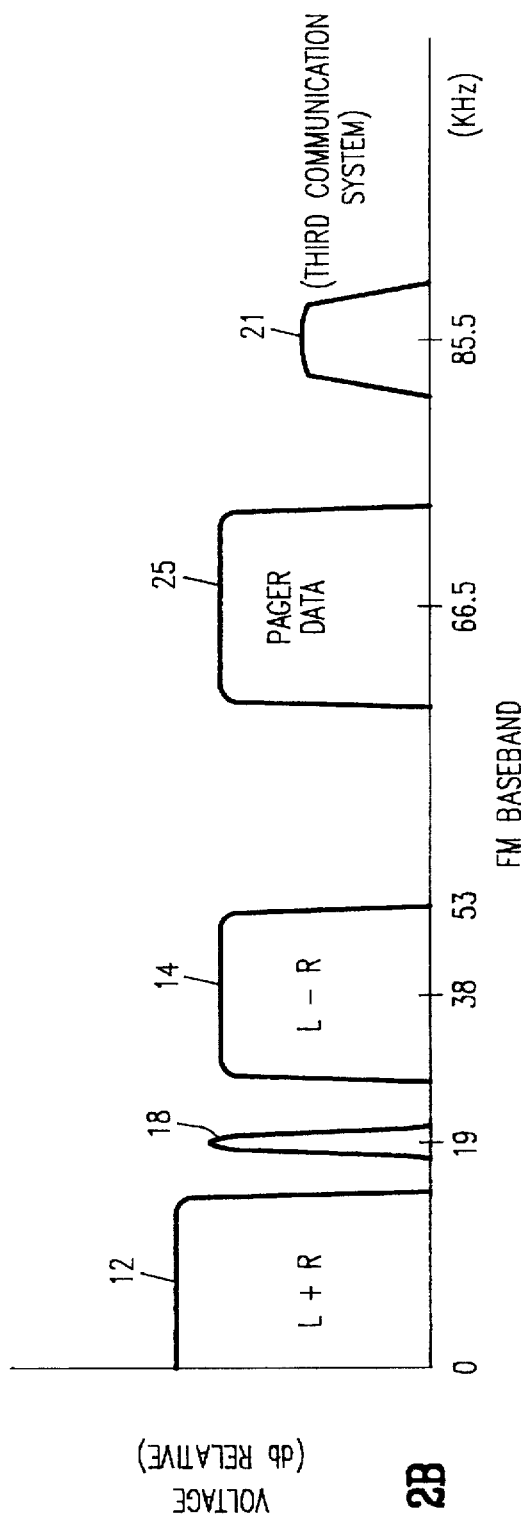
FIG. 2B is a diagram of an FM baseband for a second FM broadcast station transmitting pager data at a second subcarrier frequency according to the invention.

FIGS. 2A and 2B are diagrams showing the spectral components of signals generated from both a digital pager system according to the invention and a second communication system on the same FM broadcast channel. As described above in FIG. 1, the baseband frequencies from 23 hertz (Hz) to 53 kilohertz (kHz) are used to transmit stereo program material on channels 12 and 14. The remaining baseband frequencies from 53 kHz up to the legal maximum are typically available for transmission of other data. In the United States, information is transmitted at frequencies up to 100 kHz. In other geographical locations, such as in Europe, FM stations only transmit at frequencies up to 75 kHz.

The frequency spectrum for the baseband channel shown in FIG. 2A already carries the subcarrier 20 generated by the RDS system previously described in FIG. 1. To allow the pager system to operate on the baseband shown in FIG. 2A, pager data is transmitted on a second subcarrier 24. Subcarrier 24 contains time division multiplexed (TDM) digital pager data broadcast to one or more target receivers as described below in FIG. 3.

Subcarrier 24 has a center frequency of 85.5 kHz, a bandwidth of approximately 19 kHz and contains the same pager data previously transmitted in subcarrier 16 (FIG. 1). By transmitting the pager data on a second subcarrier 24, the pager signal does not collide with frequency band 20. Thus, the invention allows the pager system to operate in conjunction with the RDS system on the same broadcast channel.

FIG. 2B shows the frequency spectrum for a second broadcast channel carrying signals from a third communication system (other than the pager system and the RDS system). The third system generates a signal at a 85.5 kHz active subcarrier 21. Because the 85.5 subcarrier previously shown in FIG. 2A is not available for pager data, the pager system uses a 66.5 kHz subcarrier 25 for transmitting the same pager data carried by subcarrier 24 in FIG. 2A. Thus, pager data can be transmitted on the broadcast channels in both FIGS. 2A and 2B in conjunction with signals transmitted from other communication systems.

Figure 3:
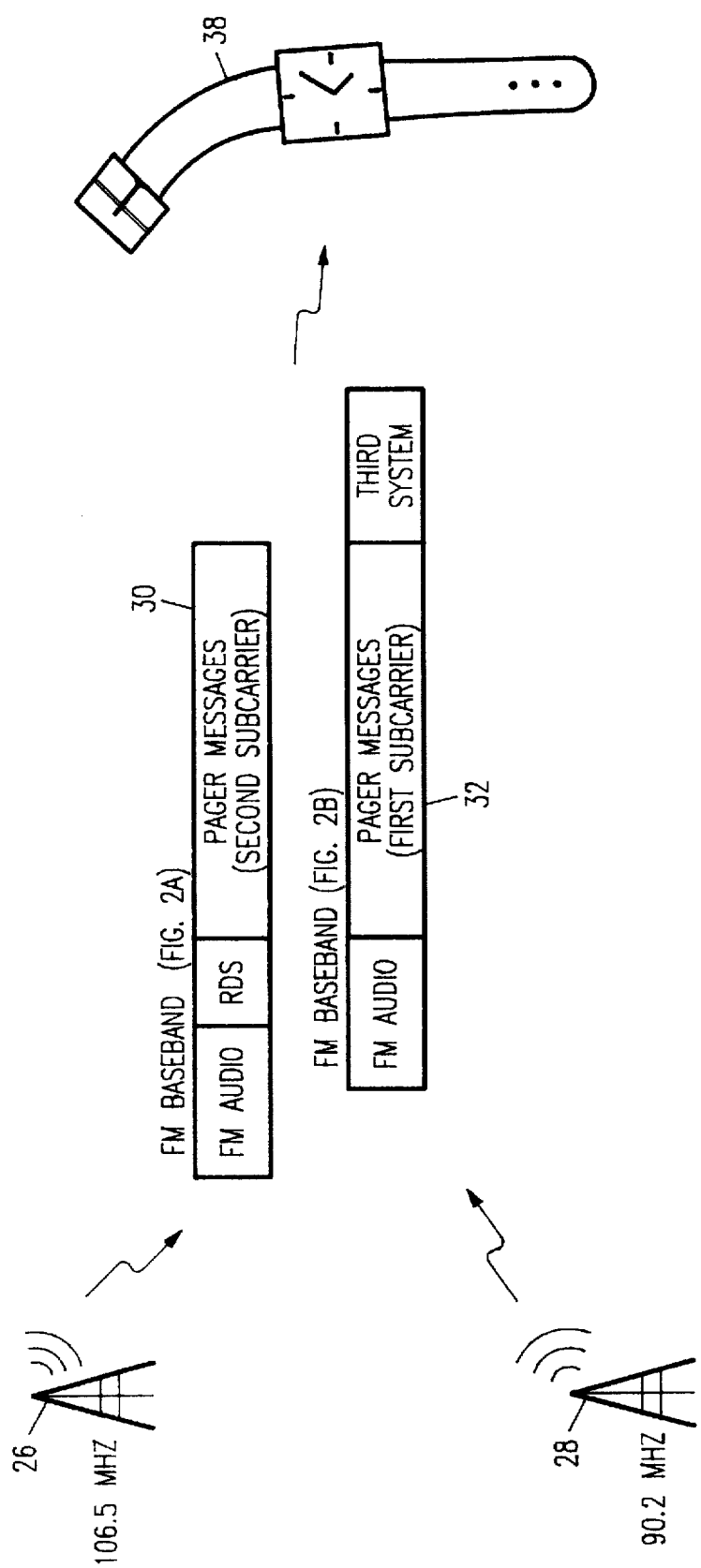
FIG. 3 is a diagram of a pager system that transmits and receives pager messages on multiple broadcast stations carrying signals from other communication systems.

Referring to FIG. 3, a pager receiver 38 demodulates whichever subcarrier 24 or 25 that is transmitted on the currently tuned broadcast channel. For example, two different broadcast stations 26 and 28 transmit the same pager messages to a watch pager 38. Broadcast station 26 has a broadcast frequency of 106.5 mega Hertz (mHz) and broadcast station 28 has a broadcast frequency of 90.2 mHz. The FM baseband for transmitters 26 and 28 each include one subcarrier containing digitally encoded pager messages 30 and 32.

The pager data 30 transmitted from broadcast station 26 is transmitted along with the FM audio signal and the data from the RDS system (FIG. 2A). Since the frequency band at the first subcarrier frequency (66.5 kHz) is already used by the RDS system, the pager data is transmitted at the second subcarrier (85.5 kHz).

Pager messages 32 transmitted from broadcast station 28 are transmitted along with the FM audio signal and the signal from a third communication system. Because the frequency band at the second subcarrier (85.5 kHz) is already used by the third communication system, broadcast station 28 transmits pager messages 32 on the first subcarrier 24 having a center frequency at 66.5 kHz (FIG. 2B).

The receiver 38 searches both the 106.5 mHz and 90.2 mHz broadcast frequencies for pager messages. When tuned to the 106.5 mHz broadcast frequency, the receiver 38 adjusts internal circuitry to demodulate pager data on the 85.5 kHz subcarrier (second subcarrier). When tuned to the 90.2 mHz broadcast frequency, the receiver 38 adjusts internal circuitry to demodulate pager data on the 66.5 kHz subcarrier (first subcarrier).

Figure 4:
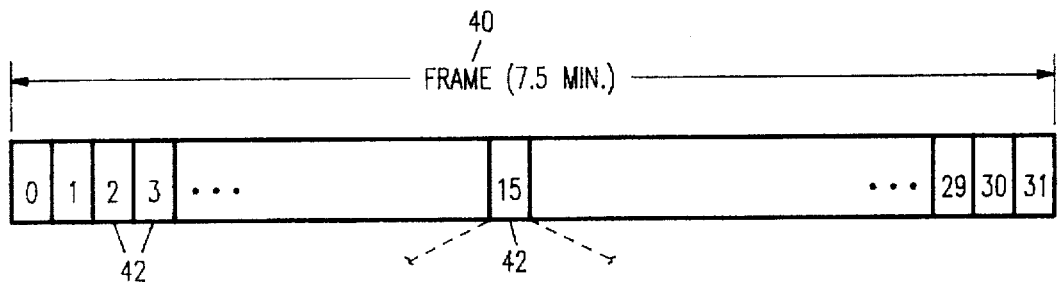
FIG. 4 is a diagram showing the format for pager data transmitted from the system shown in FIG. 3.
Figure 5:
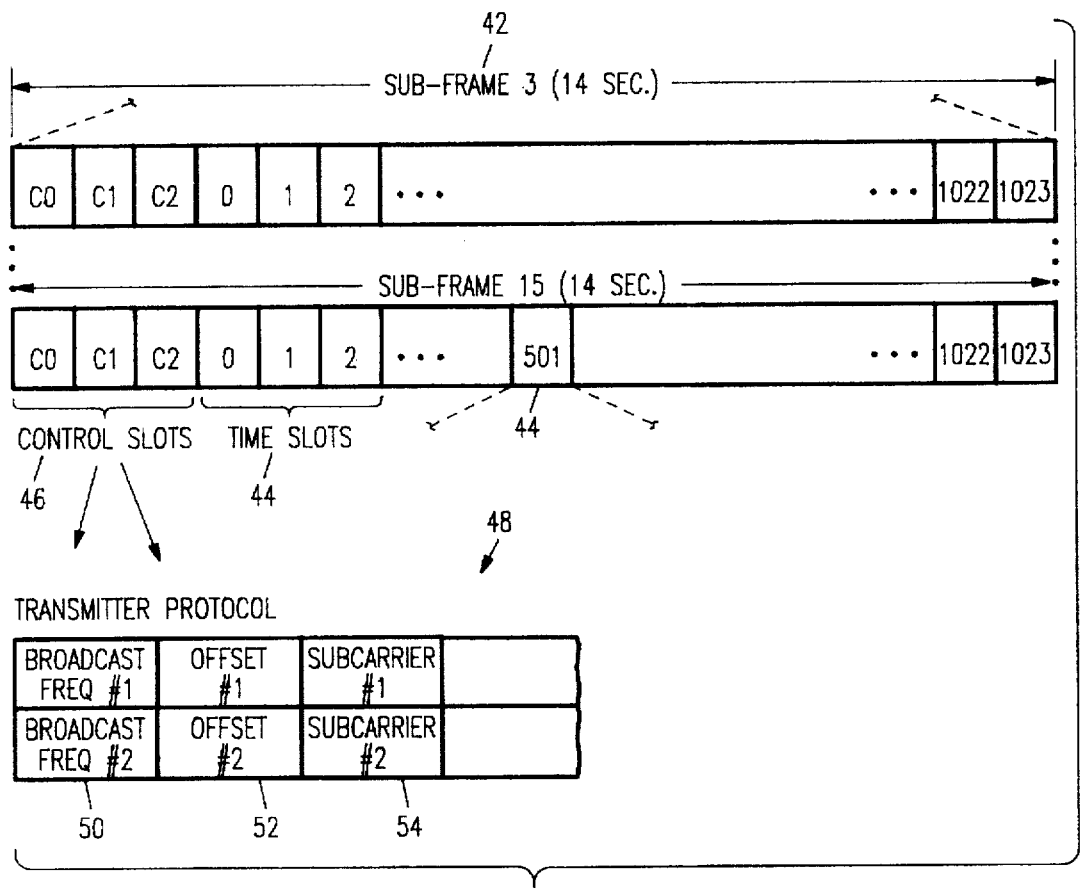
FIG. 5 is a detailed diagram of the data format shown in FIG. 4.

FIGS. 4 and 5 show the format for transmitting pager data. A time frame 40 (FIG. 4) of a predetermined length such as seven and one-half minutes is repeated cyclically. Within each frame 40 are a predetermined number of subframes 42. Thirty-two subframes of about fourteen seconds each are included in each frame 40. Each subframe is uniquely numbered 0,1,2, . . . 31.

Moving to FIG. 5, each subframe in turn comprises a predetermined number of time slots 44 during which data packets are transmitted. In FIG. 5, 1,024 time slots of about thirteen milliseconds each are shown. Each time slot is uniquely numbered 0,1,2, . . . 1023. In the illustrated example, the numbering of the time slots and subframes is sequentially increasing but this particular numbering scheme can be different so long as it repeats predictably in each frame. Subframe and time slot number information are sent in the transmitted data, and used by the receiver 38 to determine a reference point within a frame.

Frame 40 is sent from broadcast stations 26 and 28 (FIG. 3) at different time offsets. For example, the data frame 40 may be sent from broadcast station 28 thirty seconds after the same data frame 40 is transmitted from broadcast station 26. This time offset allows the receiver to read the same pager data from more than one broadcast station thus improving system response time and reception reliability.

Each subframe 42 includes multiple control packets 46 (C0-C2) associated with data packets 0-1023. The control packets 46 for each subframe contain a transmitter protocol 48 (local list) that identifies the broadcast frequencies and associated subcarrier frequencies for broadcast stations transmitting pager data within a given geographical region.

The local list in control packet C0 contains broadcast frequency fields 50 that identify the broadcast frequency for other broadcast stations in a given geographical region. Offset fields 52 identify the time offset for transmission of frames 40 from the identified broadcast stations. Subcarrier fields 54 identify the subcarrier frequency in the broadcast channel containing the frame 40.

A system for encoding and transmitting digital data into control packets, data packets, subframes and frames at a single subcarrier frequency and at a single date rate from multiple broadcast stations is described in U.S. Pat. No. 4,713,808 to Gaskill and is, therefore, not explained in any further detail. The communication protocol for transmitting pager data at multiple subcarrier frequencies is easily incorporated into current control and data packet formats. Thus, the invention can be easily incorporated into existing pager systems with little cost.

FIG. 6 is a detailed illustration of the local list 48 shown in FIG. 5. The local list contains broadcast frequencies 106.5 mHz and 90.2 mHz for broadcast stations 26 and 28, respectively (FIG. 3). The time offset field 52 indicates that frames transmitted by broadcast station 26 have a time offset of 23 seconds and that frames transmitted by broadcast station 26 have a time offset of twenty-nine seconds.

The subcarrier field 54 for the 106.5 mHz broadcast frequency has a subcarrier frequency identification flag "10". The "10" flag indicates that frame data is transmitted at the 85.5 kHz subcarrier frequency (second subcarrier frequency). The 90.2 mHz broadcast frequency has an "01" identification flag indicating that pager data is being transmitted on the 66.5 kHz subcarrier (first subcarrier frequency).

The actual subcarrier frequencies used in the system and the number of subcarrier frequencies available in the system can vary. For example, more than two subcarrier frequencies may be used for transmitting and receiving pager data. The receiver accordingly demodulates the pager data at whatever subcarrier frequency is identified in subcarrier field 54.

FIG. 7 is a detailed circuit diagram for the transmitters in broadcast stations 26 and 28 shown in FIG. 3. A data bit stream is input at terminal 56 from a local clearing house (not shown). The bit stream is fed into an encoder 58 that generates the local list 48 (FIG. 6) which identifies the subcarrier frequencies used for transmitting the pager data. The subcarrier frequency value is output to control circuit 60 and the encoded bit stream for the pager data is output to filter 62. Filter 62 outputs the frame data to a mixer 64.

Mixer 64 combines the pager data with the appropriate subcarrier frequency output from frequency generator 66 associated with the given broadcast channel. For example, the transmitter circuit in broadcast station 26 (FIG. 3) uses a 85.5 kHz frequency generator and broadcast station 28 uses the 66.5 kHz frequency generator. It is understood that more than two subcarrier frequencies can be used or subcarrier frequencies used other than those specifically identified in FIG. 7.

The control circuit 60 selectively activates frequency generator 66 according to the available baseband frequency on the broadcast station. The output from mixer 64 is combined, if applicable, by adder 72 with signals from a second system 70 (i.e., RDS) and then output to an exciter 74. If the second system 70 is not currently transmitted on the broadcast station baseband, the pager data output from mixer 64 is simply input to exciter 74.

The exciter 74 adds the main audio program material 12 and 14 (FIG. 1) to the pager data and any signals from the second system 70 generating the baseband signal shown in either FIGS. 2A or 2B. The transmission signal is then modulated at the broadcast frequency, amplified by a power amplifier 76 and output from antenna 78.

Figure 8:
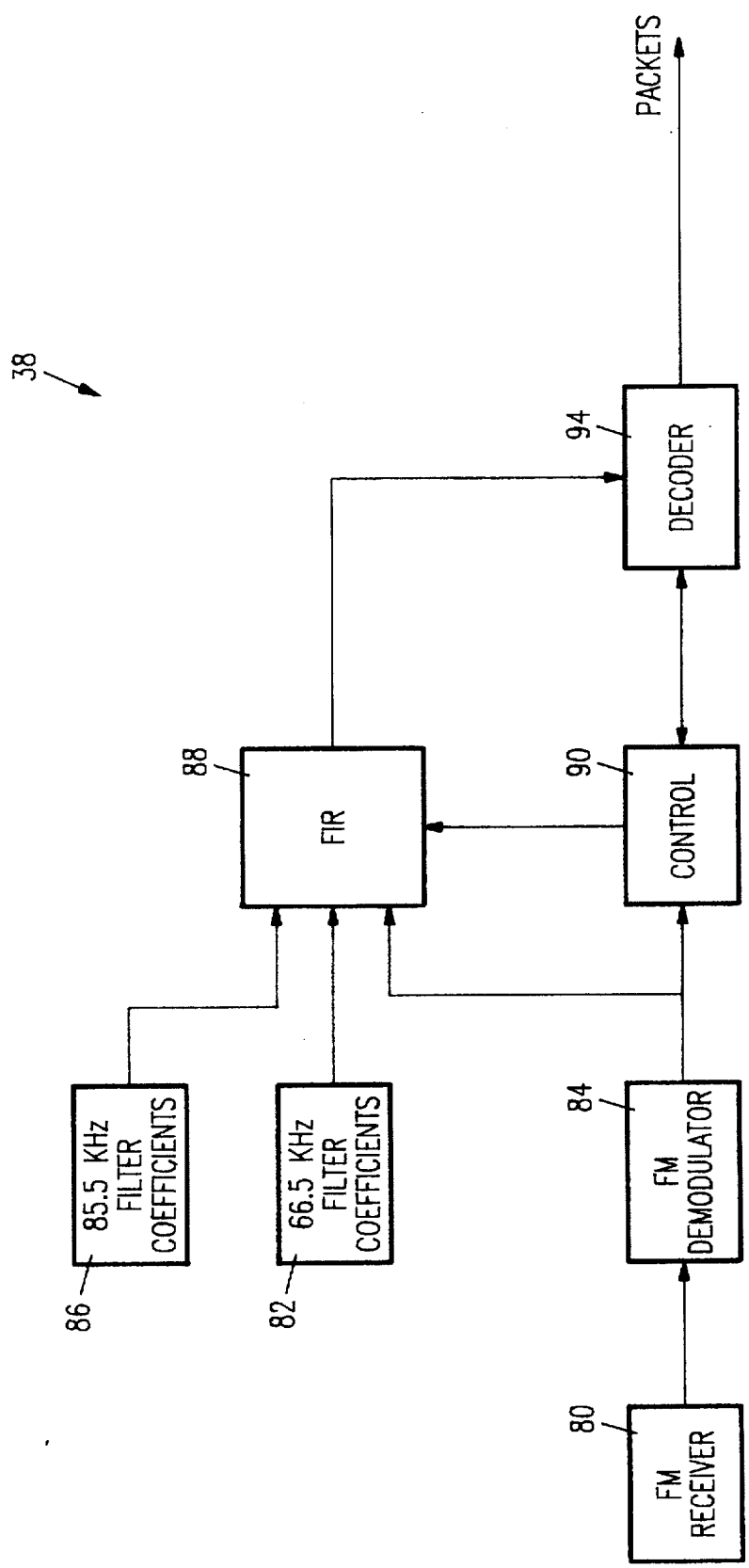
FIG. 8 is a diagram of a receiver circuit that demodulates pager data at different subcarrier frequencies according to the invention.

FIG. 8 is a detailed schematic diagram of the circuitry contained in receiver watch 38 (FIG. 3) used for receiving messages at different subcarrier frequencies. The receiver 38 includes a tunable FM receiver circuit 80 that selectively tunes to different FM broadcast frequencies. The signal at the tuned frequency is fed into FM demodulator 84 extracting the FM baseband either shown in FIGS. 2A or 2B.

A finite impulse response (FIR) filter 88 receives the output from FM demodulator 84 and the output from a memory that stores various sets of filter coefficients 82 and 86. The filter coefficients 82 are selected by filter 88 for extracting the 66.5 kHz subcarrier (if present) from the FM baseband. Filter coefficients 86 are selected by filter 88 for extracting the 85.5 kHz subcarrier (if present) from the FM baseband. Filter 88 can also operate at different clock rates for each subcarrier frequency.

Control circuit 90 decodes information in the control packets (FIGS. 5 and 6) that identify the subcarrier frequency. The control circuit 90 accordingly directs filter 88 to use the appropriate filter coefficient values 82 or 86 (or clock rate) for extracting pager data at the identified subcarrier frequency. Decoder 94 then decodes the subframes 42 (FIG. 5) to determine whether messages are directed to the receiver 38. Accordingly, receiver 26 decodes the data packets and appropriately displays or processes the pager data.

The decoder 94 and control circuitry is previously described in Gaskill and, therefore, is not explained in detail. Since demodulating pager data at multiple subcarrier frequencies simply requires selecting between different filter coefficients, the invention can be easily incorporated into existing receiver circuitry with few changes in existing pager hardware.

Figure 9:
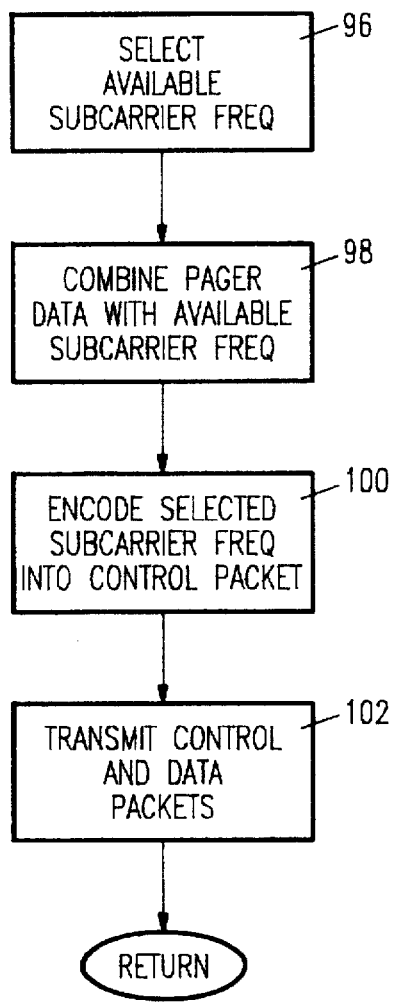
FIG. 9 is a diagram showing the steps performed by the transmitter shown in FIG. 7.

FIG. 9 is a diagram describing the operations performed by the transmitter shown in FIG. 7. Step 96 selects the subcarrier frequency used for transmitting the pager data. Certain frequency bands may be available temporarily for transmission of pager data and, therefore, the available subcarrier frequencies for a given broadcast station may change.

The transmitter in step 98 mixes the frame data previously shown in FIGS. 4 and 5 with the selected subcarrier frequency. Step 100 encodes the subcarrier frequency value selected in step 96 into the subcarrier field 54 of a control packet. The control packet and data packets are then combined in subframe 42 (FIG. 5). The transmitter in step 102 transmits the subframes together in a frame 42 at the given broadcast frequency.

Figure 10:
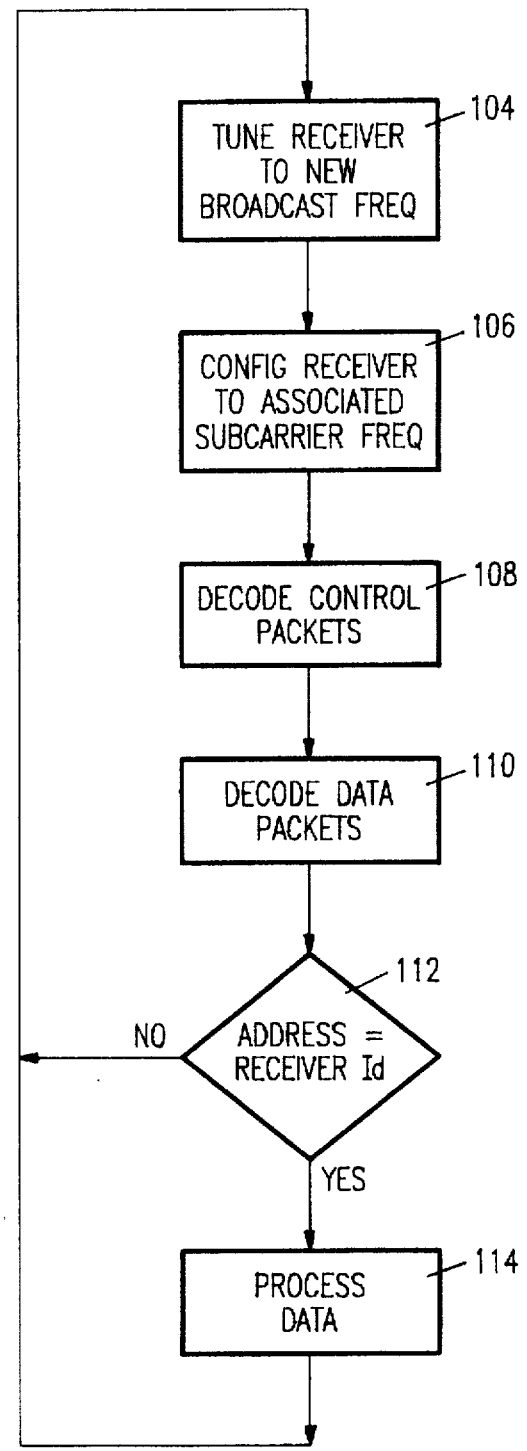
FIG. 10 is a diagram showing the steps performed by the receiver shown in FIG. 8.

FIG. 10 is a diagram describing the steps performed by the receiver shown in FIG. 8. Step 104 tunes the receiver to a given broadcast frequency identified as containing pager data. For example, the receiver may have previously received a local list (FIG. 6) from another broadcast station that identified various broadcast frequencies and associated subcarrier frequencies in a given geographical region.

The receiver in step 106 reconfigures the receiver to demodulate the pager data at the associated subcarrier frequency. As described above, the receiver determines the subcarrier frequency by reading the local list transmitted by another broadcast station. This allows the receiver to tune directly to the correct subcarrier frequency without searching alternate frequencies.

If the local list does not contain subcarrier frequency information or the receiver has not previously read a valid local list, the receiver can alternatively decode data at each possible transmitted subcarrier frequency until pager data is successfully identified.

Step 108 decodes the control packets associated with the pager data. As described above in FIG. 5, the control packets include an additional list of alternative broadcast frequencies and associated subcarrier frequencies carrying pager data.

Step 110 activates the receiver at synchronized time slots to determine if the data packets are addressed to the receiver. If the data packet address does not match the receiver's identification number, decision step 112 returns to step 104. If the data packet address matches the receiver identification number, the information in the data packet is processed in step 114 before returning to step 104.

In step 104, the receiver retunes to the next identified broadcast frequency that may contain pager data. The receiver is then automatically reconfigured to the subcarrier frequency associated with the new broadcast frequency.

The invention described above allows the pager system to operate with other communication systems transmitting signals on FM broadcast channels. The invention also increases reliability by transmitting multiple subcarriers at the same time on the same broadcast channel. The invention can be used in existing digital message formats with minimal changes to the transmitter and receiver circuitry. Thus, the invention is easily incorporated into existing wireless communication systems.

The specific embodiment of the invention shown herein is a system where the receiver receives signals at one of two locations on the baseband of an FM radio signal. It should be understood that alternative embodiments of the invention receives signals at any one of three or more locations on the baseband. Likewise in the embodiment shown herein at any particular time, the receiver only receives signals centered at one baseband frequency, in alternative embodiments of the invention, the receiver could simultaneously receives signals centered at two or more frequencies out of three or more possible baseband frequencies.

While the invention is described in the context of one-way wireless paging systems, it is understood that the invention can be utilized in any system used to transmit wireless digital information.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A radio paging system for transmitting digital pager data on an FM baseband, comprising:

multiple transmitters for transmitting the pager data on a first subcarrier and second subcarrier on different associated broadcast frequencies;

a receiver that selectively decodes the pager data on one of said first subcarrier and said second subcarrier according to the subcarrier associated with the broadcast frequencies, each of said transmitters including;

an encoder including an input for receiving a digital bit stream and an output;

a frequency generator;

a mixer coupled to both the encoder output and the frequency generator;

a second communication source; and an exciter coupled to both the mixer and the second communication source.

2. A paging system according to claim 1 wherein said receiver includes the following:

a tunable FM receiver;

an FM decoder coupled to the FM receiver;

a selectable subcarrier filter coupled to the FM decoder;

a memory coupled to the filter for storing a first and second set of filter coefficients.

3. A radio paging system for transmitting digital pager data on an FM baseband, comprising:

multiple transmitters for transmitting the pager data on a first subcarrier frequency and second subcarrier frequency on different associated broadcast frequencies;

a receiver that selectively decodes the pager data on one of said first subcarrier frequency and said second subcarrier frequency according to the subcarrier associated with the broadcast frequencies; and wherein each of said transmitters includes an encoder for generating a subcarrier frequency identification value.

4. A paging system according to claim 3 wherein said receiver includes a decoder for identifying the subcarrier frequency identification value.

5. A method for transmitting and receiving digital signals transmitted on multiple FM broadcast channels, comprising:

transmitting digital signals on at least one of a first subcarrier frequency and a second subcarrier frequency;

tuning to one of said multiple FM broadcast channels;

identifying one of said first and said second subcarrier frequencies used for transmitting the digital signals on the tuned broadcast channel;

selectively decoding the digital signals at the identified subcarrier frequency for the tuned broadcast channel; and including transmitting a subcarrier frequency identification flag with said digital signals.

6. A method according to claim 5 including transmitting the digital signals on the first subcarrier frequency on a first broadcast channel and transmitting the digital signals with the second subcarrier frequency on a second broadcast channel.

7. A method for transmitting and receiving digital pager data on different FM broadcast channels, comprising:

encoding the digital pager data into time division multiplexed data packets;

selecting one of multiple subcarrier frequencies for transmitting the data packets on an FM broadcast channel;

encoding a broadcast channel identification field and a subcarrier frequency identification field into a control packet identifying the broadcast channel and associated subcarrier frequency for the data packets;

transmitting the control packet and the data packets together as a continuous data frame at a given broadcast frequency;

decoding the control packet to determine the broadcast channel carrying the data packets;

tuning to the broadcast channel identified in said control packet; and decoding said data packets at the subcarrier frequency associated with the tuned broadcast channel according to the subcarrier frequency identified in said control packets.

* * * * *